(12) United States Patent
Hagelthorn (10) Patent No.: US 9,970,486 B2
(45) Date of Patent: May 15, 2018

(54) SYSTEM AND METHOD FOR MEASURING PRE-LOAD FORCE DURING TAPERED ROLLER BEARING WHEEL ADJUSTMENT (71) Applicant: George A. Hagelthorn, Vya, NV (US)

(72) Inventor: George A. Hagelthorn, Vya, NV (US)

(*) Notice: Subject to any disclaimer, the term of this patent is extended or adjusted under 35 U.S.C. 154(b) by 0 days. days.

(21) Appl. No.: 15/814,191

(22) Filed: Nov. 15, 2017

(65) Prior Publication Data

US 2018/0073564 A1 Mar. 15, 2018

Related U.S. Application Data

(63) Continuation-in-part of application No. 15/000,761, filed on Jan. 19, 2016, now Pat. No. 9,835,198.

(60) Provisional application No. 62/104,187, filed on Jan. 16, 2015.

(51) Int. Cl.
*F16C 25/06* (2006.01)
*F16C 43/04* (2006.01)
*F16C 19/36* (2006.01)
*F16C 41/00* (2006.01)

(52) U.S. Cl.
CPC ............ *F16C 43/04* (2013.01); *F16C 19/364* (2013.01); *F16C 25/06* (2013.01); *F16C 41/008* (2013.01); *F16C 2229/00* (2013.01); *F16C 2326/02* (2013.01)

(58) Field of Classification Search
CPC .... F16C 19/364; F16C 19/386; F16C 19/548; F16C 25/05; F16C 41/008; F16C 43/03; F16C 2229/00; F16C 2326/02
See application file for complete search history.

(56) References Cited

U.S. PATENT DOCUMENTS

| | | | |
|---|---|---|---|
| 5,366,300 A | 11/1994 | Deane et al. | |
| 5,535,517 A * | 7/1996 | Rode | B25B 327/064 29/252 |
| 5,560,687 A * | 10/1996 | Hagelthorn | B60B 27/001 301/105.1 |
| 5,795,037 A * | 8/1998 | Hagelthorn | B60B 27/001 301/105.1 |
| 5,967,721 A * | 10/1999 | Giachinta | F16B 39/282 411/120 |
| 6,089,673 A | 7/2000 | Wiacek et al. | |
| 7,000,995 B2 | 2/2006 | Hagelthorn | |
| 7,346,985 B1 | 3/2008 | Strait | |

(Continued)

FOREIGN PATENT DOCUMENTS

EP 0668491 A2 8/1995
JP 2000097230 A 4/2000

*Primary Examiner* — Phillip A Johnson
(74) *Attorney, Agent, or Firm* — Dinsmore & Shohl LLP (57) ABSTRACT

Improved systems and methods facilitate precise adjustment of wheel-end tapered roller bearing preload force on an axle spindle with a diameter, a longitudinal groove or flat, and a thread pattern to receive a hexagonal adjustment nut with six outer edges. A system may include a flat inner washer, an inner adjustment nut, a flat outer washer having an outer tab extending from the outer edge and a plurality of markings on the outer surface or the outer edge of the outer washer, each marking indicating the amount of rotation needed to cause a predefined lateral movement of the inner adjustment nut as a function of the diameter and thread pattern of the axle, and an outer adjustment nut.

20 Claims, 7 Drawing Sheets

INNER WASHER (For Micro Processing)

(56) References Cited

U.S. PATENT DOCUMENTS

| | | | |
|---|---|---|---|
| 7,389,579 B2 * | 6/2008 | Rode ................... | B25B 327/062 29/252 |
| 7,547,077 B2 * | 6/2009 | Melberg ................ | G01K 5/62 116/216 |
| 8,745,875 B1 | 6/2014 | Hagelthorn | |

* cited by examiner

INNER WASHER (For Micro Processing)

*Inner D-Washer*        *The Adjustment Nut*

(Set 1)

*The SnugNut™ DWasher*        *The SnugNut™*

(Set 2)

FIG. 3

For 1 - 14 Pitch 1" diameter Spindle

INNER WASHER (For Micro Processing)

SYSTEM AND METHOD FOR MEASURING PRE-LOAD FORCE DURING TAPERED ROLLER BEARING WHEEL ADJUSTMENT

REFERENCE TO RELATED APPLICATION

This application is a Continuation-in-part of application Ser. No. 15/000,761, filed on Jan. 19, 2016, which claims priority from U.S. Provisional Patent Application Ser. No. 62/104,187, filed on Jan. 16, 2015, the entire contents of which are incorporated herein by reference.

FIELD OF THE INVENTION

This invention relates generally to tapered roller bearings and, in particular, to an improved method of adjusting tapered roller bearings such that similar units of dimension (thousandths of an inch) may be used to quantify the adjustment for preload as well as for endplay.

BACKGROUND OF THE INVENTION

Endplay

For many years, tapered roller bearing adjustment consisted of mounting a hub, two tapered roller bearings, two washers, and an oil seal onto the axle spindle to be retained with a spindle nut. The assembly was adjusted by rotating the spindle nut to achieve the condition known as desired "endplay." This term describes the amount of lateral movement of the hub assembly with respect to the axle spindle resulting from a measure of looseness attributable to the established position of the spindle nut. This movement has been measured and expressed by the number of thousandths on an inch (0.001"). Typically the acceptable range of endplay has been on the order of 0.001" to 0.005".

Preload

The term "preload" was adopted by the roller bearing industry to identify the pounds of force applied against the bearings after the spindle nut had been tightened to the extent endplay was no longer discernible. Unfortunately, it was not possible to measure the amount of preload force that occurs within the wheel-end assembly unless some form of internal sensor was placed into appropriate contact with either of the tapered roller bearings. Although this has been done on an experimental basis, it is not feasible for vehicles in highway operations due to excessive cost.

SUMMARY OF THE INVENTION

This invention resides in improved systems and methods of adjusting tapered roller bearings such that similar units of dimension (i.e., thousandths of an inch) may be used to quantify the adjustment for preload as well as for endplay.

The invention is adapted to adjusting wheel-end tapered roller bearing preload force on an axle spindle with a diameter, a longitudinal groove or flat, and a thread pattern to receive a hexagonal adjustment nut with six outer edges. A basic system includes a flat round inner washer having an inner diameter corresponding to the diameter of the axle, an outer diameter, an inner surface, and outer surface and an outer edge. The inner washer includes a tab or D-shape to cooperate with a groove or flat, respectively on the axle to ensure that the washer does not rotate following installation. A plurality of markings are provided on the outer surface or the outer edge of the inner washer, each marking indicating the amount of rotation needed to cause a 0.001" lateral movement of the adjustment nut as a function of the diameter and thread pattern of the axle.

In a preferred embodiment, the tab or D-shape has a center defined by a line projecting radially outwardly from the center of the axle, and the plurality of markings are on both sides of this center. The outer diameter of the inner washer may include a plurality of clusters of markings, each cluster having a plurality of the markings, and/or with different markings for course and fine adjustment.

As hex nuts include outer edges between flats, the outer diameter of the inner washer may be conveniently aligned with the points on the adjustment nut, thereby allowing an installer to compare the points on the nut and the markings to achieve a desired degree of preload force resulting from the measured lateral movement. In the preferred embodiment, the markings provide 0.000" to 0.003" of preload force to be imposed on the wheel bearings due to the axial movement of the adjustment nut on the axle spindle.

A first disclosed method, for single nuts, includes the steps of: installing the inner washer of claim 1 on the spindle; installing a hex adjustment nut with geometric features onto the spindle over the inner washer; tightening the hex adjustment nut until it becomes snugly positioned against the inner washer; and further tightening the hex adjustment nut against the washer while comparing at least one of the geometric features of the nut to the markings on the inner washer to achieve a desired degree of preload force.

A second disclosed method, for double jam nuts, includes the steps of:

providing the inner washer of claim 1, an adjustment nut, an intermediate washer with an outer tab, and an outer nut;

establishing a preliminary preload force on the tapered roller bearings using a calibrated torque wrench;

installing the hex adjustment nut with geometric features onto the spindle over the inner washer;

tightening the hex adjustment nut until it becomes snugly positioned against the inner washer;

further tightening the hex adjustment nut against the washer while comparing at least one of the geometric features of the nut to the markings on the inner washer to achieve a desired degree of preload force;

installing the intermediate washer and the outer retainer nut onto the spindle; and bending the tab of the intermediate washer over the adjoining flat of the retainer nut.

A third disclosed method, for tapered roller bearing adjustment on a 1" axle spindle having a diameter with 1-14 threads to equip trailers generally used in light-duty applications includes the steps of:

providing an inner D washer, an adjustment nut, the inner washer of claim 1 including an outer, bendable tab, and an outer retaining nut;

installing the inner D washer and adjustment nut onto the spindle;

tightening the adjustment nut by applying sufficient torque to seat the bearings and oil seal;

using a wrench, back off the adjustment nut with sufficient counter-clockwise rotation so as to reduce the preload force to approximately zero;

installing the tabbed outer washer and retainer nut, in that order, finger-tight against the adjustment nut;

bending the tab of the outer washer over a corresponding flat of the retainer nut; and rotating the adjustment nut counterclockwise with a wrench to move it outwardly and against the tabbed outer washer with a prescribed degree of jamming force.

DETAILED DESCRIPTION OF THE INVENTION

This invention makes it possible to accurately adjust tapered roller bearings with the result being identified in terms of thousandths of an inch for preload as well as for endplay. Two common sizes of trailer axles are currently in use in commercial freight operations, and both benefit from this invention. A third axle configuration used on trailers equipped for hauling recreational pleasure boats served as the basis for development of the commercial freight industry versions.

Version #1 (Single Nuts)

Figure 1:
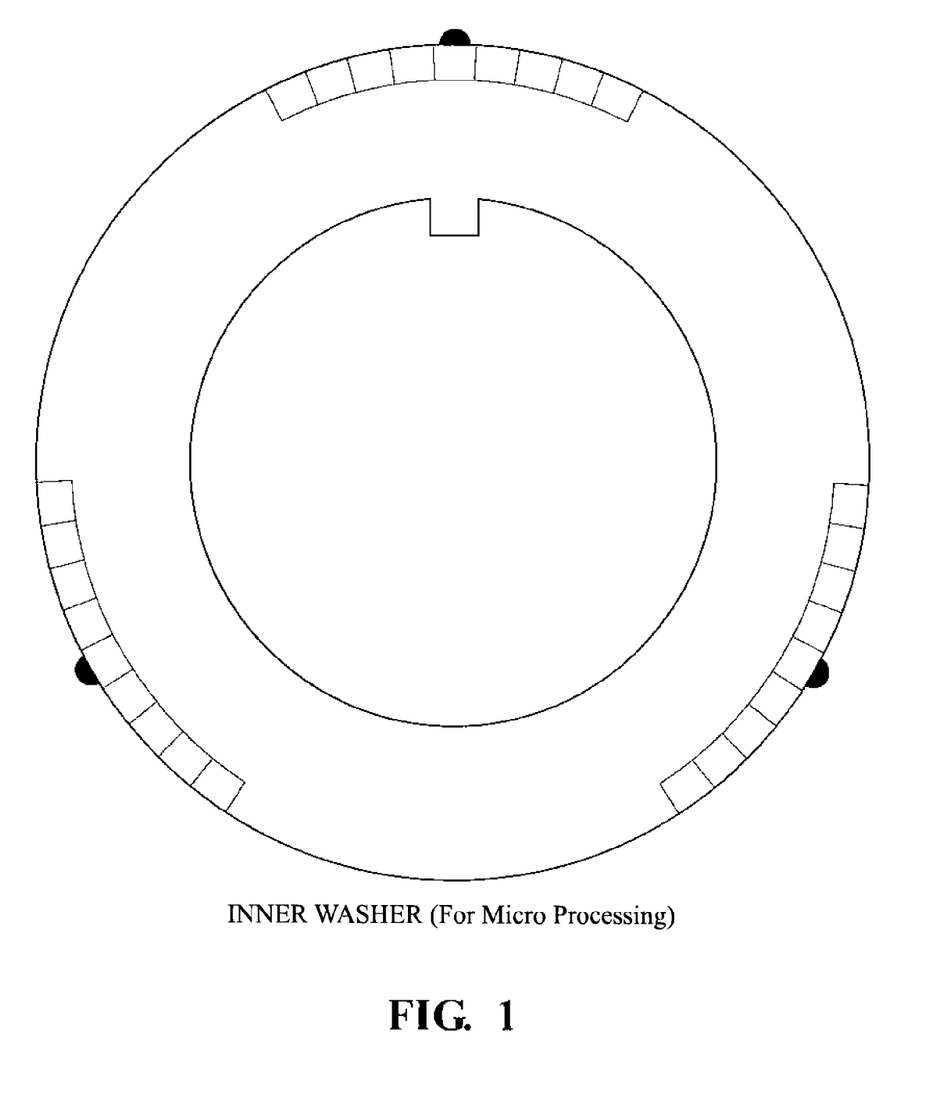
FIG. 1 is a drawing of an inner washer that provides precise preload wheel bearing adjustment of wheel-end systems.

FIG. 1 shows a novel inner washer according to the invention that provides precise preload wheel bearing adjustment of wheel-end systems that have been used only for end play adjustment in the past. The ProTorq nut manufactured by Stemco, which has been in use for more than 25 years, can be used as an example. Without altering its basic design, the ProTorq nut assembly can be converted to deliver finite adjustment nut axial movement in terms of thousandths of an inch of preload merely by adding the inner washer of FIG. 1 to the hub assembly.

The inner washer of FIG. 1 makes it possible to monitor precise movement of the ProTorq nut or any single nut by reference with the segmented markings on the outer face of the washer. One model of the ProTorq nut is designed for application on the industry standard 2.625" diameter axle having 1-16 threads. By rotating this nut incrementally with respect to the segmented markings on the face of the washer, axial movement of the threaded spindle nut will change 0.001" with respect to each mark. Each increment of movement correlates with 5.76 degrees of nut rotation. This amount of angular rotation accrues only on the 2.625" diameter axle spindle equipped with 1-16 threads.

The original installation instructions provided by the nut manufacturer can be used after the addition of the inner washer of FIG. 1 to mount the hub assembly complete with the oil seal, the tapered roller bearings, and the ProTorq Nut. By following the manufacturer's published instructions, the hub can be adjusted with 0.000" to 0.003" of endplay. At this point of the preload adjustment assembly process, the Pro-Torq nut can be slightly tightened to advance its reference point to the third segment mark shown on the inner washer. This will cause 0.000" to 0.003" of preload force to be imposed on the wheel bearings due to the axial movement of the nut on the axle spindle. Achieving this level of adjustment complies with the Society of Automotive Engineers (SAE) Recommended Practice J2535, Wheel Bearing Adjustment on Heavy Duty Vehicles, which specifies that preload should be restricted to levels that are "lightly controllable and repeatable."

Step 4 of the Stemco installation instructions provides the technique to install the Keeper. The Keeper is the contrivance which interlocks the ProTorq Nut to the keyway of the axle spindle to secure the adjusted level of preload and to prevent inadvertent rotation of the nut.

There is opportunity to develop alternate methods to assembly wheel end systems with controlled preload for other existing adjustment nuts. Using the micro positioning procedures provided by the washer of FIG. 1, unique single nut designs can be adjusted to achieve a level of controlled preload condition similar to the methods described for the Stemco ProTorq Nut in VERSION #1. However, it remains that any single nut so assembled must also be adequately secured to prevent subsequent rotational movement. Independent developments by diverse spindle nut manufacturers will be needed for those purposes.

Version #2 (Double Jam Nuts)

There are a variety of double jam nut configurations that would also benefit by using the micro positioning preload concept made possible by the inner washer, of FIG. 1.

The combination of four basic components; the Inner Washer, an Adjustment Nut, an Outer Washer, and an Outer Nut will serve as an example for explaining how conventional wheel end components can be used to achieve controlled and repeatable preload.

The Technology and Maintenance Council (TMC) of the American Trucking Associations (ATA) published a Recommended Practice, RP-618 that advises how the hub can be mounted on an axle spindle in preparation for wheel bearing adjustment that establishes measured endplay.

The same TMC RP-618 instructions used to achieve a measure of endplay are also appropriate to establish the basis from which controlled positioning of any Adjustment Nut can be accomplished for follow-up preload adjustment as follows:

Step 1 Bearing Lubrication

Lubricate the bearings with the same lubricant as used in the hub.

Step 2 Initial Adjusting Torque

Tighten the adjusting nut to a torque of 200 ft-lbs. while rotating the wheel.

Step 3 Initial Back Off

Back off the adjusting nut one full turn.

Step 4 Re-Torque Adjustment

Re-torque the adjusting nut to 50 ft-lbs. while rotating the wheel.

The above four STEPS establish a preliminary preload force on the tapered roller bearings by using a calibrated torque wrench. This level of preload force assures that the oil seal and the bearings will be properly set in position within the hub on the axle spindle. The preload force in this condition will be well in excess of the recommendations specified by the SAE Recommended Practice J2535. However, from this condition, STEP 5 can be initiated (Note: Final back off applies to 2⅝" diameter axles having 16 threads per inch):

Step 5

Installation of the exemplar four-piece double jam nut configuration proceeds with controlled back off of the Adjustment Nut from the 50 ft-lbs. STEP 4 Torque Adjustment position until it becomes slightly loose. The Adjustment Nut is then retightened until it becomes snugly positioned against the Inner Washer of FIG. 1, with a minimum of finger tightening force. Following this, the final level of preload force is then applied by additionally tightening the Adjustment Nut using the segmented marks on the Inner Washer of FIG. 1 for reference.

Each segmented mark on the Inner Washer represents 0.001" of axial movement of the Adjustment Nut with respect to the axle spindle. By rotating the Adjustment Nut to the second segmented mark on the Inner Washer, the amount of force against the tapered roller bearings will be increased to 0.002" of measured preload that is compatible with SAE RP J2535.

Step 6

The Double Jam Nut version of controlled wheel bearing adjustment is completed with the addition of the Intermediate Washer and the Outer Retainer Nut bring jammed with a slight amount of finger applied torque. A secured assembly is assured with the bending of the tab of the Intermediate Washer over the adjoining flat of the Retainer Nut.

Note: In STEP 6, if a more secure jammed condition is desired, this can be accomplished by backing off the Adjustment Nut with as much as 50 ft-lbs. of torque to apply outward force against the Intermediate Washer and the Retainer Nut. It can then be safely secured with bending the tab of the Intermediate Washer over the adjoining flat of the Retainer Nut. This back off rotation of the Adjustment Nut will not significantly change the amount of preload force installed in STEP 5.

Version 3 (1" Axle Spindle with 1-14 Threads)

A third variation of a controlled preload axle system is designed to equip trailers generally used in light-duty applications. This four-piece spindle nut system provides an exceptional method to adjust wheel bearings on utility trailers as well as on trailers used for transporting recreational pleasure boats. The system, shown in FIG. 3, comprises (in order of assembly on the axle spindle) an Inner D Washer, an Adjustment Nut, a SnugNut™ D Washer, (with an outer, bendable tab), and an outer retainer nut (the SnugNut™). This four-piece spindle nut system enables replacement of wheel bearings on axles having one-inch diameter spindles with 1-14 threads. To assure reliable performance, it is recommended that the oil seal also be replaced as part of any wheel-end retrofit maintenance procedure.

Figure 3:
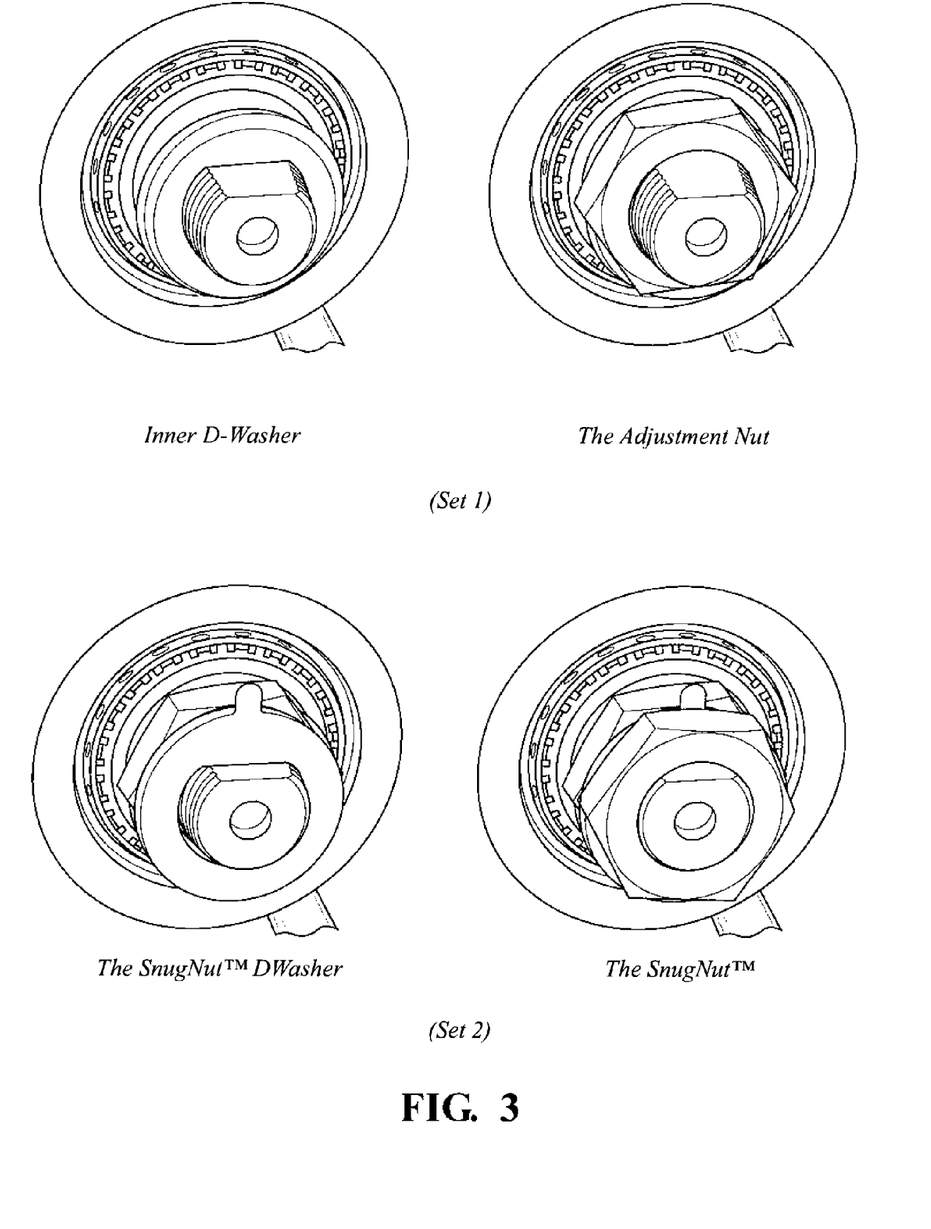
FIG. 3 shows, that in all embodiments, washers may have an inner tab as opposed to a D configuration, depending on the application.

The system of FIG. 3 comprises Component Set #1 with the Inner D-Washer and the Adjustment Unhand Set #2 that includes the SnugNut™ D-Washer and the SnugNut™ (a retainer nut). Set #1 Inner D-Washer and Adjustment Nut are installed with a light measure of preload force on the bearings that allows the hub to rotate smoothly and freely without endplay. This determination can be either as the result of finger tightening effort or it can be in accordance with reference to the segmented markings on the rim or the face of the Inner D-Washer.

After Set #2 components SnugNut™ D-Washer and the SnutNut™ have been positioned against the Set #1 Adjustment Nut, the tab on the SnugNut™ D-Washer is bent over the adjoining float of the SnugNut™ to prevent further rotation. Using a wrench, the Adjustment Nut is then rotated counterclockwise to apply an outward force against the D-Washer #2. The applied torque by the wrench should be nominal, but enough to achieve a jammed condition of the assembly.

It is important to understand that the amount of preload force applied against the wheel bearings will change only slightly following the back off of Set #1 against Set #2. The Set #2 components placed against the Adjustment Nut prevents Set #1 from moving outward even though The Adjustment Nut is rotated counterclockwise during the final step of the installation procedure. Any change in the amount of preload originally installed resulting from backing off Set #1 will be minimal. Thus, reliable wheel end performance is assured.

Detailed Installation Procedure

After the hub assembly has been placed on the axle spindle, the following steps to be taken in accordance with the recommended wheel bearing adjustment procedure apply to 1-14 nuts used on one inch diameter axle spindles. Note that the assembly of spindle configurations accommodating nuts other than the 1-14 size will require specific installation instructions from the spindle nut supplier.

STEP 1: With the inner washer in place, thread the adjustment nut onto the spindle by hand.

STEP 2: Using a conventional wrench, tighten the adjustment nut by applying enough torque to seat the bearings and oil seal (approximately 50 foot pounds). A calibrated torque wrench would assure consistency, but it is not necessary.

STEP 3: Using a wrench, back off the Adjustment Nut with approximately 45 degrees of counter-clockwise rotation. This amount of back-off rotation will reduce the preload force installed in Step 2 to approximately zero. It will then be possible to rotate the Adjustment Nut with finger applied force.

STEP 4: At this point, the adjustment nut can be rotated by hand to snugly position it against the inner washer shown in FIG. 4. This establishes the position of the Adjustment Nut from which further adjustment will occur if the nut is rotated. Because preload also occurs with the rotation of the spindle nut, it becomes the task to identify and correlate the lateral movement of the spindle nut on the spindle with respect to the degrees of rotation. Selecting 0.001" increments for lateral movement of the spindle Nut established the basis for determining the corresponding number of degrees of rotation of the spindle nut on the axle spindle for each increment.

Figure 2:
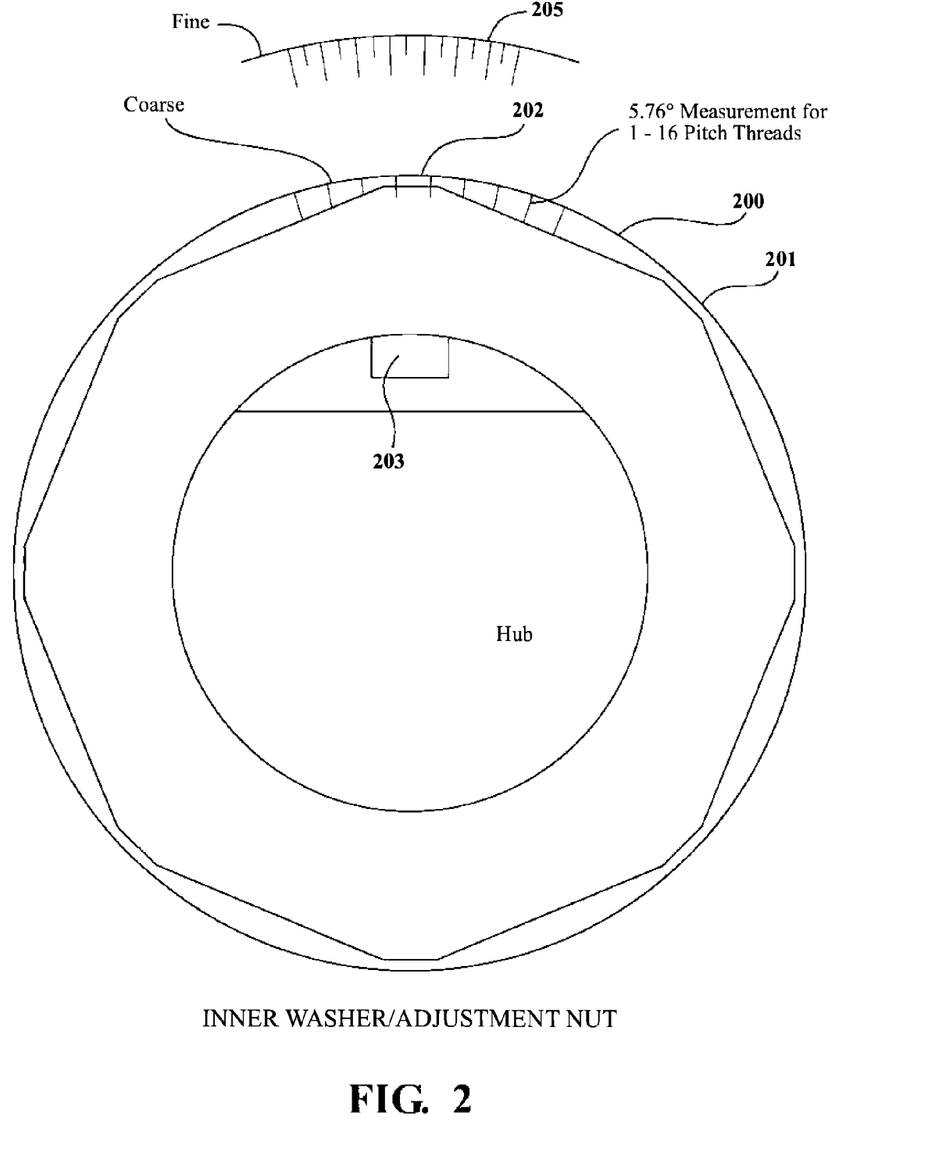
FIG. 2 shows how the face of the inner washer adjacent to the adjustment nut may be marked to show each 0.001" segment for reference when rotating the adjustment nut.

Similarly, as shown in FIG. 2, the face of the inner washer 200 adjacent to the adjustment nut 201 is marked to show each 0.001" segment for reference when rotating the adjustment nut 201. These calibrations indicate the amount of rotation needed to cause lateral movement of the adjustment nut for each 0.001" change of axial movement. In use, typically the installer compares the point 202 with respect to the markings to determine the number of segments realized during the course of rotation. Although only a number of marks are shown they may be made to appear completely around the washer on one face or the other and/or the side edge. FIG. 3 also shows that in all embodiments, washers may have an inner tab 203 as opposed to a D configuration 204 depending on the application. For fine threads, closer marks may be used as shown on the inset 205 view in FIG. 2.

Figure 4:
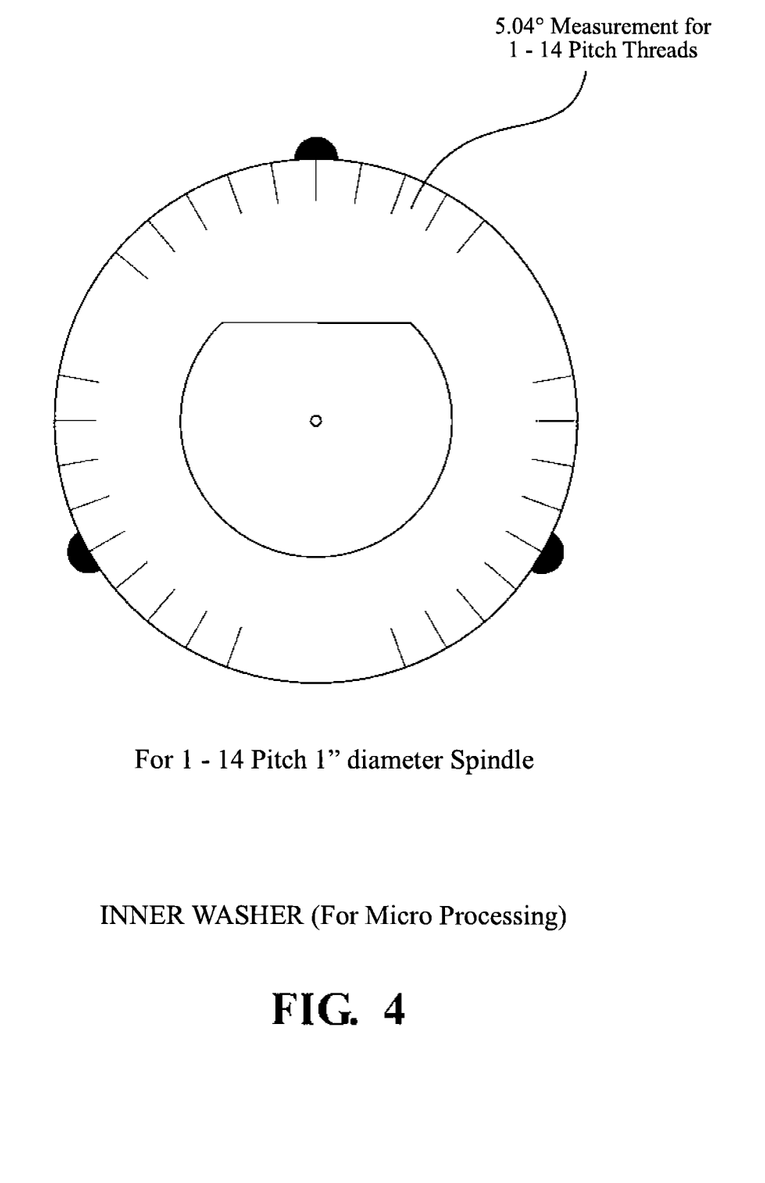
FIG. 4 illustrates an alternative arrangement wherein a D washer includes three separate clusters of 0.001" segments.

FIG. 4 illustrates an alternative arrangement wherein a D washer includes three separate clusters of 0.001" segments. In practice only one such cluster is needed, but because the orientation of the flat or the keyway of the axle could be anywhere on the 360-degree circumference, it would be advantageous if the visual reference could always be on the top in easy sight of the installer. Also, the projection at the top of each cluster is intended to be helpful in establishing a reference during the final adjustment movement.

STEP 5: Install the SnugNut Washer and the SnugNut, finger tight against the Adjustment Nut. The tab on the SnugNut™ Washer must be bent over the flat of the SnugNut™ before proceeding to Step 6. If the flat of the nut is not ideally oriented to accept the tab of the washer, the nut can be removed and reinstalled with the former outer face being repositioned inward. This will enable the flat of the Adjustment Nut to become better aligned with the tab of the SnugNut™ Washer.

STEP 6: To achieve the final jam-locked condition of the SnugNut™ system, the Adjustment Nut must be rotated counterclockwise with the wrench to move it outward against the SnugNut™ Washer. The unique design of the smaller SnugNut™ allows easy access to the Adjustment Nut regardless of the type of wrench selected. It is essential that the Adjustment Nut be rotated counterclockwise for final securement. The recommended amount of back-off for jamming the Adjustment Nut outward against the SnugNut™ is 25 foot pounds. This completes the jammed assembly making it resistant to any change. For disassembly, the SnugNut™ will resist movement until after the Adjustment Nut is first repositioned with 30 degrees of clockwise rotation to release the jammed assembly.

Calculations (Determination of Segment Measurements)

Case 1: 1-12 Thread Pitch=$\frac{1}{12}$=0.0833 threads per inch
Case 2: 1-14 Thread Pitch=$\frac{1}{14}$=0.0714 threads per inch
Case 3: 1-16 Thread Pitch=$\frac{1}{16}$=0.0615 threads per inch
Let x=amount of axial movement
Axial movement/Thread Pitch/inch is equivalent to degrees of nut rotation/360 degrees Therefore,
Each 0.001" of axial movement/Pitch=degrees of rotation×360 degrees or:
Degrees of nut rotation=0.001"/Pitch×360 degrees
Degrees of nut rotation for of each 0.001 inch of axial segment movement are as follows:
Case 1: 1-12 Pitch Degrees of nut rotation=0.001/0.0833×360=4.32 degrees
Case 2: 1-14 Pitch Degrees of nut rotation=0.001/0.0714×360=5.04 degrees
Case 3: 1-16 Pitch Degrees of nut rotation=0.001/0.0615×360=5.76 degrees Version 4

Figure 5:
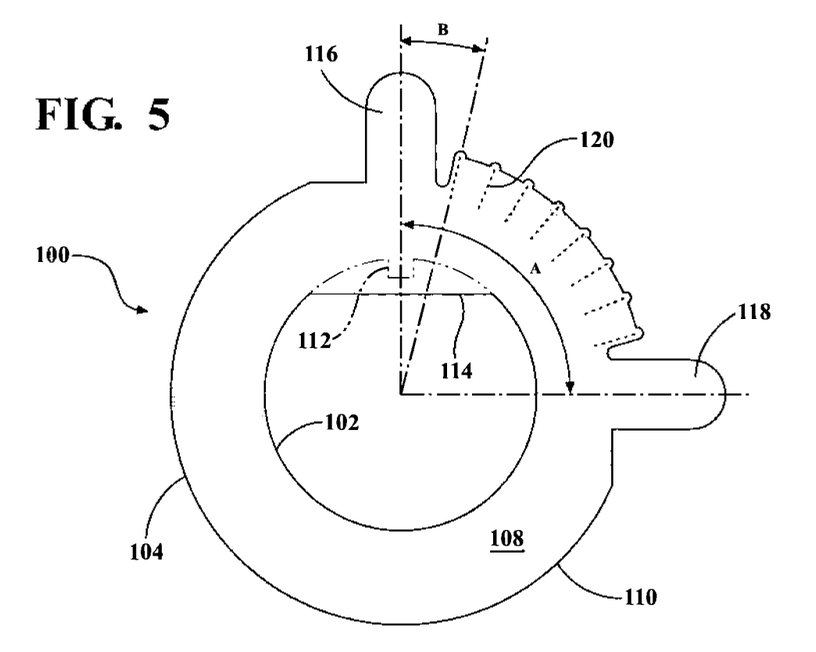
FIG. 5 is a drawing of an outer washer according to a further embodiment of the present invention, and which may be used with certain embodiments of a system and method according to the present invention.

FIG. 5 shows an outer washer according to a further embodiment of the present invention, which may be used with certain embodiments of a system and method according to the present invention. The outer washer 100 has an inner diameter 102 corresponding to the diameter of an axle with which the outer washer is to be used. The washer further has an outer diameter 104, an inner surface (facing into the page), an opposed outer surface 108 and an outer edge 110. The outer washer may have a tab 112 for cooperation with a groove in the axle or a flat 114 to form a D-shape to cooperate with a flat on the axle, either of which ensures the washer does not rotate following installation. The outer washer 100 has an outer tab 116, which may be a first outer tab, extending from the outer edge 110. The outer washer may have additional tabs, such as second outer tab 118. In this example, the tabs are disposed at an angle A of approximately 90 degrees from each other.

The outer washer also has a plurality of markings on the outer surface or the outer edge, each indicating the amount of rotation needed to cause a predefined lateral movement of an inner adjustment nut as a function of the diameter and thread pattern of the axle. The markings may take a variety of forms. One example, shown in FIG. 5, comprises surface markings 120 on the outer surface. A second example, also shown in FIG. 5, comprises bumps 122 defined on the outer edge 110. There are a plurality of such markings angularly spaced apart from each other. In this example, they are spaced apart from each other at equal angular intervals of approximately 10 degrees. Further, in this example, the markings are disposed between the first tab and second tab, with the first marking defined at a position approximately 7.5 degrees (Angle B) from the centerline of the first tab 116.

Figure 6:
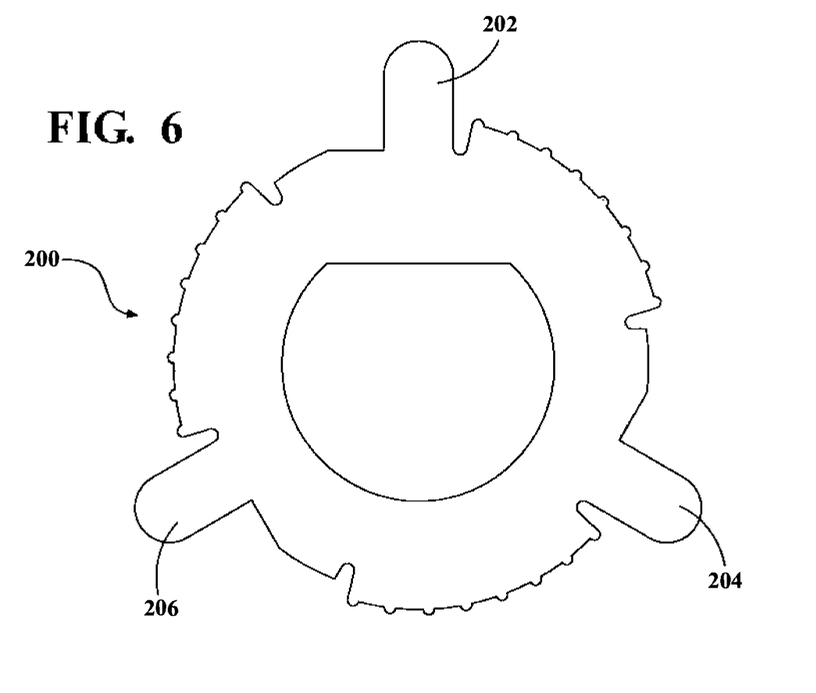
FIG. 6 is a drawing of an alternative outer washer according to a further embodiment of the present invention, and which may be used with certain embodiments of a system and method according to the present invention.

FIG. 6 illustrates an alternative outer washer 200, having a first tab 202, a second tab 204 and a third tab spaced apart at approximately 120 degree intervals. A set of a plurality of markings is provided in the gap between each pair of tabs. This allows the washer to be more easily used in multiple rotational positions.

Figure 8:
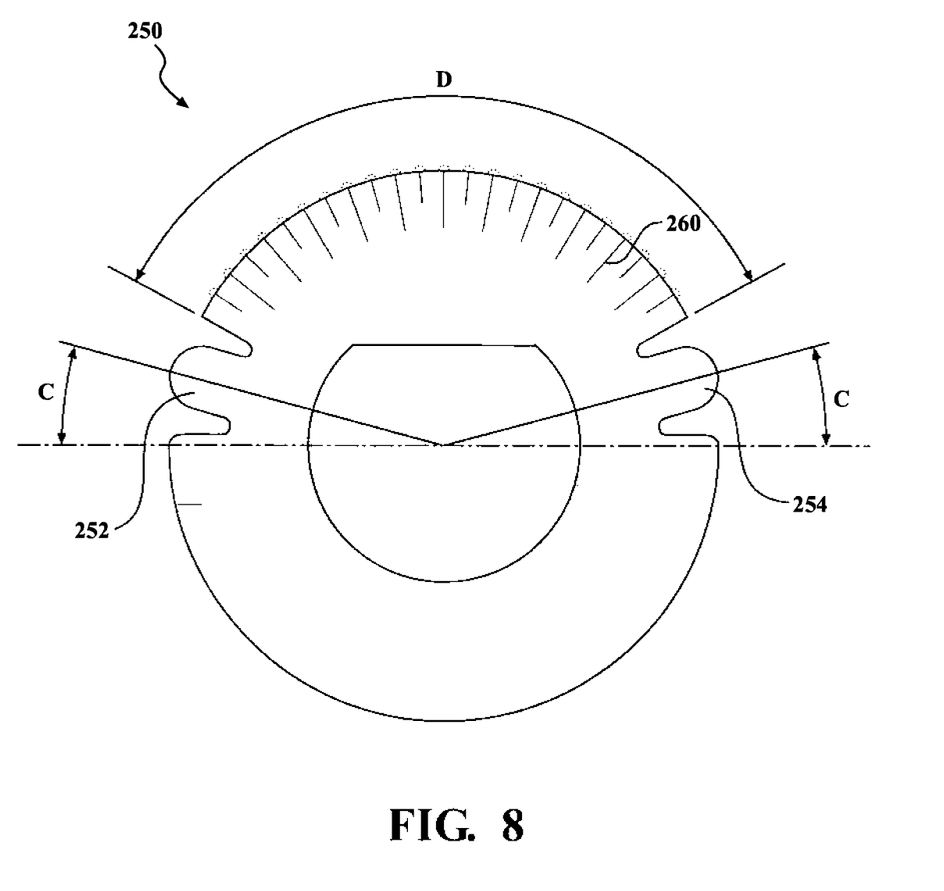
FIG. 8 is a drawing of a further alternative outer washer according to another embodiment of the present invention, and which may be used with certain embodiments of a system and method according to the present invention.

FIG. 8 illustrates another alternative outer washer 250, having a first tab 252 and a second tab 254 which are spaced apart at an angle D of approximately 150 degrees. The angle C between each tab and a cross-sectional line E is approximately 15 degrees. A group of a plurality of markings 260 is provided in the gap between the tabs. The markings may be markings on the surface as shown in solid lines and/or bumps as shown in phantom lines. As with the earlier embodiments, the markings may be spaced apart at equal angular of approximately 10 degrees or, in some embodiments, 5 degrees, as shown. This embodiment has certain advantages. The greater spacing between the tabs makes it more likely that one will line up with a flat of the nut well enough to hold it in place. If one point of a hex nut is aligned with one tab, which is the worst position, the other tab is aligned with a flat. Also, the greater number of markings means that there is more flexibility in the starting position of the nut, while still allowing rotation to provide the desired movement. With a hex nut, once one point or edge of the nut is rotated past the markings, the next point or edge is within the range of the markings and can be used. The washer 250 may be used with any embodiment of the present invention.

Figure 7:
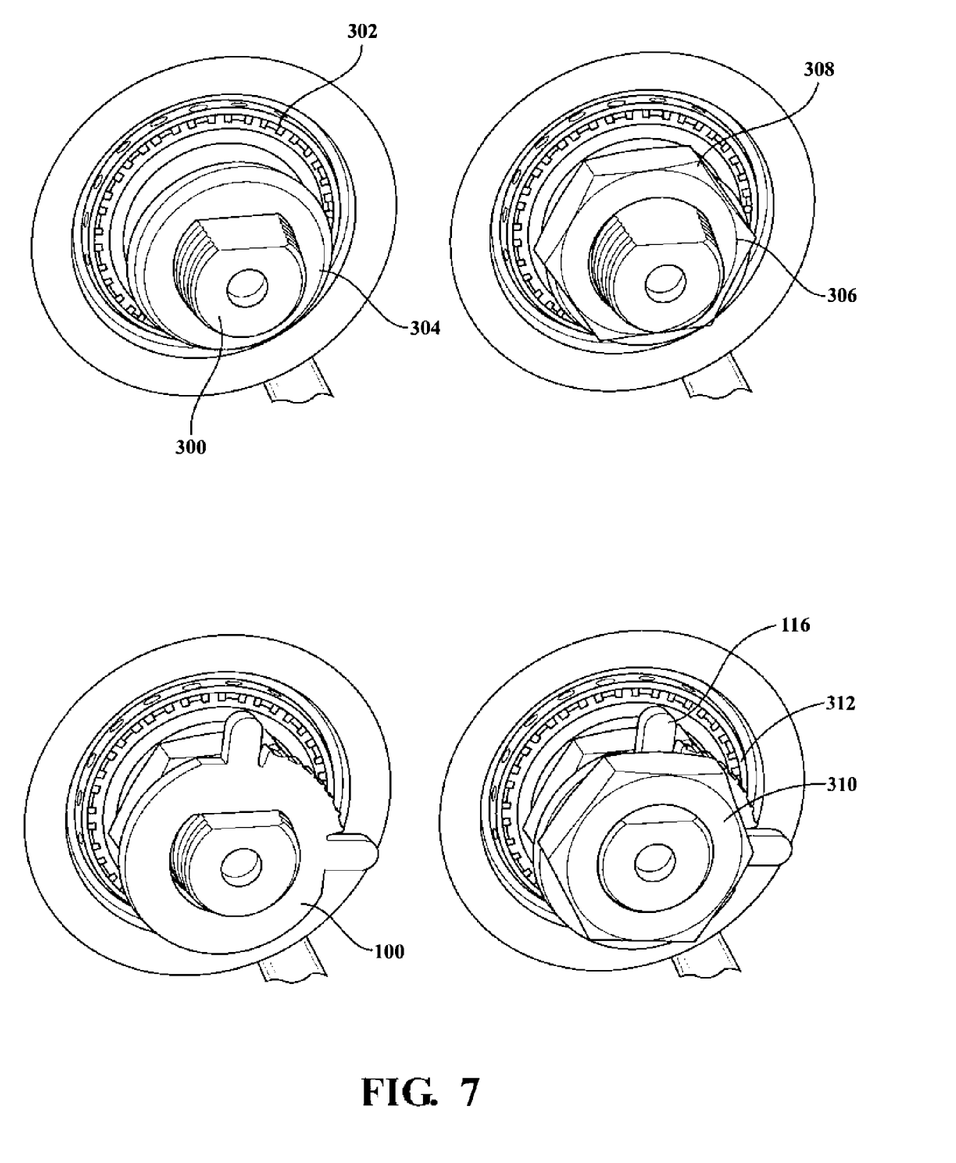
FIG. 7 is a drawing showing a wheel bearing preload method and system using the washer of FIG. 5.

A method of using a washer 100, 200 or 250 will now be described with reference to FIG. 7. All reference in this section will be to washer 100 but a person of skill in the art will recognize that the method may be practiced with washer 200 or 250 with appropriate allowances. An axle spindle 300 has a tapered roller bearing assembly 302. A flat inner washer 304 is installed onto the spindle 300. This washer is a standard flat washer and may have a tab or D-shape to prevent rotation. An inner adjustment nut 306 is installed onto the spindle over the inner washer 304 and tightened until it becomes positioned against the inner washer, which is against the bearing assembly. This may be referred to as a "snug" position. The nut 306 in this example is a hex nut with six outer edges or points 308. Alternatively, other nuts may be used, such as 8 sided or other multi-sided designs. In some examples of the method, the nut 306 is tightened more than merely snug or finger tight, to seat the bearings. This may be to a predefined torque or by feel. The nut is then rotated outwardly to reduce the preload force to approximately zero, then retightened to be snug, and positioned against the washer. At this position, there is approximately zero preload on the bearing assembly.

Next, the outer washer 100 is installed onto the spindle over the inner adjustment nut 306 with the inner surface of the outer washer toward the inner adjustment nut.

Next, an outer adjustment nut 310 is installed onto the spindle over the outer washer and tightened until the outer adjustment nut is positioned against the outer washer, which is positioned against the inner adjustment nut 306. As with the inner adjustment nut, the outer adjustment nut may be a hex nut with 6 outer edges or points 312. These edges or points 312 may serve as marks for use with the markings on the outer washer 100. Alternatively, the outer adjustment nut may have one or more other marks for use with the markings. After the outer adjustment nut is positioned against the outer washer 100, the outer adjustment nut is further tightened while comparing the mark (i.e. edge 312) to the markings (bumps in this example) on the outer washer. In one example, the increment between each bump corresponds to 0.001" of preload. The outer nut will push the inner nut inwardly by the small amount necessary to increase the preload even though the inner nut is not rotated. Once the desired preload is achieved, one of the tabs 116 is bent over a flat of the outer adjustment nut, thereby locking into position. Which tab is used will depend on the position of the nut.

The system may achieve a more highly jammed condition by then rotating the inner nut outwardly against the outer washer and nut. This will not substantially change the preload since the outer nut's position remains the same.

In some examples, an outer nut may be used where the faces of the nut are non-symmetrical with respect to the threads. This means that the nut will be in a different rotational position depending on whether it is tightened with one face inwardly or the opposite face inwardly. Such a nut may be beneficial for aligning the mark and/or flats with respect to the outer washer.

As will be clear to those of skill in the art, the herein described embodiments of the present invention may be altered in various ways without departing from the scope or teaching of the present invention. It is the following claims, including all equivalents, which define the scope of the present invention.

The invention claimed is:

1. A system for adjusting wheel-end tapered roller bearing preload force on an axle spindle with a diameter, a longitudinal groove or flat, and a thread pattern to receive an adjustment nut, comprising:
   a flat inner washer having an inner diameter corresponding to the diameter of the axle, an outer diameter, an inner surface, and an outer surface, the flat inner washer being received onto the axle spindle;
   an inner adjustment nut having a thread pattern to be received onto the axle spindle against the flat round inner washer;
   a flat outer washer having an inner diameter corresponding to the diameter of the axle to be received onto the axle spindle against the inner adjustment nut, an outer diameter, an inner surface, an outer surface and an outer edge, wherein the outer washer includes a tab or D-shape to cooperate with a groove or flat, respectively, on the axle to ensure that the washer does not rotate following installation, the flat outer washer having an outer tab extending from the outer edge and a plurality of markings on the outer surface or the outer edge of the outer washer, each marking indicating the amount of rotation needed to cause a predefined lateral movement of the inner adjustment nut as a function of the diameter and thread pattern of the axle; and
   an outer adjustment nut having a thread pattern to be received onto the axle spindle against the flat outer washer, the outer adjustment nut having a mark defined thereon for alignment with one of the plurality of markings on the outer washer;
   wherein the outer tab of the outer washer is bent over the outer adjustment nut after assembly of the system.

2. The system of claim 1, wherein the plurality of markings on the outer surface or the outer edge of the outer washer comprise a plurality of bumps on the outer edge of the outer washer.

3. The system of claim 1, wherein the plurality of markings on the outer surface or the outer edge of the outer washer are spaced apart at equal angular intervals.

4. The system of claim 3, wherein the equal angular intervals are approximately 5 degrees.

5. The system of claim 1, wherein the outer tab of the outer washer is a first outer tab, the outer washer further comprising a second outer tab.

6. The system of claim 5, wherein the second outer tab is disposed approximately 150 degrees from the first outer tab.

7. The system of claim 6, wherein the plurality of markings on the outer surface or the outer edge of the outer washer are disposed in the approximately 150 degree gap between the outer tabs.

8. The system of claim 1, wherein the outer tab of the outer washer is a first outer tab, the outer washer further comprising at least a second outer tab angularly spaced from the first outer tab by less than 180 degrees, the plurality of markings on the outer surface or the outer edge of the outer washer comprising at least two groups of markings, each group of markings comprising a plurality of markings spaced apart at equal angular intervals, one of the groups of markings being disposed in the less than 180 degree angular spacing between the first outer tab and second outer tab.

9. The system of claim 1, wherein the outer adjustment nut is a multi-sided nut and the mark defined on the outer adjustment nut comprises any of the outer edges of the multi-sided nut.

10. The system of claim 1, wherein the inner washer includes a tab or D-shape to cooperate with the groove or flat, respectively, on the axle to ensure that the inner washer does not rotate following installation.

11. A method of ensuring a desired degree of preload force during tapered roller bearing adjustment on an axle spindle having a diameter with a thread pattern and a longitudinal groove or flat, the method comprising the steps of:
   installing the inner washer of claim 1 on the spindle;
   installing the inner adjustment nut of claim 1 onto the spindle to abut the inner washer;
   tightening the inner adjustment nut until it becomes positioned against the inner washer;
   installing the outer washer of claim 1 onto the spindle over the inner adjustment nut with the inner surface of the outer washer towards the inner adjustment nut;
   installing the outer adjustment nut of claim 1 onto the spindle over the outer washer;
   tightening the outer adjustment nut until it becomes positioned against the outer washer;
   further tightening the outer adjustment nut against the outer washer while comparing the mark of the outer adjustment nut to the plurality of markings on the outer surface or the outer edge of the outer washer to achieve a desired degree of preload force; and
   bending the outer tab over the outer adjustment nut.

12. The method of claim 11, further comprising, after the step of further tightening the outer adjustment nut, rotating the inner adjustment nut to move it outwardly and against the outer washer.

13. The method of claim 11, further comprising, after the step of tightening the inner adjustment nut until it becomes positioned against the inner washer, further tightening the inner adjustment nut to seat the bearings, then rotating the inner adjustment nut outwardly so as to reduce the preload force to approximately zero, then tightening the inner adjustment nut until it becomes positioned against the inner washer.

14. The method of claim 11, wherein the plurality of markings on the outer surface or the outer edge of the outer washer comprise a plurality of bumps on the outer edge of the outer washer.

15. The method of claim 11, wherein the plurality of markings on the outer surface or the outer edge of the outer washer are spaced apart at equal angular intervals.

16. The method of claim 15, wherein the equal angular intervals are approximately 5 degrees.

17. The method of claim 11, wherein the outer tab of the outer washer is a first outer tab, the outer washer further comprising a second outer tab disposed approximately 150 degrees from the first outer tab, the plurality of markings on the outer surface or the outer edge of the outer washer being disposed in the approximately 150 degree gap between the outer tabs.

18. The method of claim 11, wherein the outer tab of the outer washer is a first outer tab, the outer washer further comprising at least a second outer tab angularly spaced from the first outer tab by less than 180 degrees, the plurality of markings on the outer surface or the outer edge of the outer washer comprising at least two groups of markings, each group of markings comprising a plurality of markings spaced apart at equal angular intervals, one of the groups of markings being disposed in the less than 180 degree angular spacing between the first outer tab and second outer tab.

19. The method of claim 11, wherein the outer adjustment nut is a multi-sided nut and the mark defined on the outer adjustment nut comprises any of the outer edges of the multi-sided nut.

20. The method of claim 11, wherein the inner washer includes a tab or D-shape to cooperate with the groove or flat, respectively, on the axle to ensure that the inner washer does not rotate following installation.

* * * * *